United States Patent
Lu et al.

(10) Patent No.: US 11,256,525 B2
(45) Date of Patent: Feb. 22, 2022

(54) OBJECT STARTING METHOD AND DEVICE

(71) Applicant: Beijing Xiaomi Mobile Software Co., Ltd., Beijing (CN)

(72) Inventors: Yizhan Lu, Beijing (CN); Shangmingxue Kang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 37 days.

(21) Appl. No.: 15/824,622

(22) Filed: Nov. 28, 2017

(65) Prior Publication Data

US 2018/0165105 A1 Jun. 14, 2018

(30) Foreign Application Priority Data

Dec. 9, 2016 (CN) .......................... 201611130153.3

(51) Int. Cl.
*G06F 9/451* (2018.01)
*G06F 8/38* (2018.01)
*G06F 3/0482* (2013.01)
*G06F 3/04817* (2022.01)

(52) U.S. Cl.
CPC ............ *G06F 9/451* (2018.02); *G06F 3/0482* (2013.01); *G06F 8/38* (2013.01); *G06F 3/04817* (2013.01)

(58) Field of Classification Search
CPC .......... G06F 9/451; G06F 3/0482; G06F 8/38; G06F 3/04817
See application file for complete search history.

(56) References Cited

U.S. PATENT DOCUMENTS

| | | | | |
|---|---|---|---|---|
| 5,821,926 A | * | 10/1998 | Arita | G06F 3/0481 715/744 |
| 5,940,078 A | * | 8/1999 | Nagarajayya | G06F 3/04817 715/835 |
| 6,091,409 A | * | 7/2000 | Dickman | G06F 3/0481 715/760 |
| 2002/0122076 A1 | * | 9/2002 | Nakaki | G06F 3/0481 715/847 |
| 2003/0184600 A1 | * | 10/2003 | Lin-Hendel | G06F 3/04817 715/853 |

(Continued)

FOREIGN PATENT DOCUMENTS

| | | |
|---|---|---|
| CN | 103559046 A | 2/2014 |
| CN | 104375856 A * | 2/2015 |

(Continued)

OTHER PUBLICATIONS

Partial European Search Report issued in corresponding EP Patent Application No. 17205508.9, dated Apr. 24, 2018, 17 pages.

(Continued)

*Primary Examiner* — Mandrita Brahmachari
(74) *Attorney, Agent, or Firm* — Arch & Lake LLP

(57) ABSTRACT

Object starting methods and devices using the same are provided. In some aspects, the method includes displaying starting entries of one or more objects on a predetermined page of a device. The method also includes receiving a first operating signal corresponding to one of the starting entries, and activating an object corresponding to the one of the starting entries using the first operating signal. In some aspects, the method may further include outputting prompting information based on the activation of the object.

17 Claims, 13 Drawing Sheets

(56) References Cited

U.S. PATENT DOCUMENTS

| | | | |
|---|---|---|---|
| 2005/0054384 A1 | 3/2005 | Pasquale | |
| 2005/0108406 A1 | 5/2005 | Lee | |
| 2008/0046100 A1 | 2/2008 | Balasubramanian | |
| 2008/0046830 A1 | 2/2008 | Pasquale | |
| 2008/0235408 A1* | 9/2008 | Takei | G06F 3/1204 710/19 |
| 2009/0178008 A1* | 7/2009 | Herz | G06F 3/04817 715/840 |
| 2010/0011304 A1* | 1/2010 | van Os | G06F 3/04817 715/762 |
| 2010/0050128 A1* | 2/2010 | Chiang | G06F 3/0482 715/847 |
| 2012/0266106 A1* | 10/2012 | Asaimuthu | G06F 3/04892 715/835 |
| 2012/0297342 A1* | 11/2012 | Jang | G06F 3/04817 715/823 |
| 2013/0104114 A1* | 4/2013 | Reiss | G06F 8/65 717/170 |
| 2013/0196615 A1* | 8/2013 | Zalmanovitch | H04M 15/7652 455/405 |
| 2013/0326413 A1 | 12/2013 | Croft | |
| 2014/0137005 A1 | 5/2014 | Park et al. | |
| 2014/0201681 A1* | 7/2014 | Mahaffey | H04M 1/72569 715/846 |
| 2014/0298267 A1 | 10/2014 | Chan et al. | |
| 2015/0100570 A1* | 4/2015 | Zent | G06F 16/334 707/723 |
| 2015/0121306 A1 | 4/2015 | Fundament | |
| 2015/0199110 A1* | 7/2015 | Nakazato | G06F 3/0487 715/763 |
| 2015/0235403 A1* | 8/2015 | Schneider | G06T 11/60 345/629 |
| 2015/0277938 A1* | 10/2015 | Lu | G06F 9/451 717/168 |
| 2015/0346952 A1* | 12/2015 | Yang | G06F 3/04817 715/765 |
| 2016/0103668 A1 | 4/2016 | Srinivasan et al. | |
| 2016/0117388 A1 | 4/2016 | Fan | |
| 2016/0125504 A1 | 5/2016 | Narayanan et al. | |
| 2016/0239069 A1* | 8/2016 | Um | G06F 1/3231 |
| 2016/0291831 A1* | 10/2016 | Baek | G06F 3/0412 |
| 2017/0123607 A1 | 5/2017 | Srinivasan et al. | |
| 2017/0147659 A1 | 5/2017 | Fan et al. | |
| 2018/0329607 A1* | 11/2018 | Han | G06F 3/04817 |
| 2019/0114067 A1* | 4/2019 | Xu | G06F 3/04817 |
| 2019/0205011 A1* | 7/2019 | Li | G06F 1/163 |

FOREIGN PATENT DOCUMENTS

| | | |
|---|---|---|
| CN | 104798037 A | 7/2015 |
| CN | 105955716 A | 9/2016 |
| CN | 106201219 A | 12/2016 |
| EP | 1962478 A1 | 8/2008 |
| GB | 2347318 A | 8/2000 |
| WO | 2012031892 A1 | 3/2012 |
| WO | 2016057051 A1 | 4/2016 |

OTHER PUBLICATIONS

Notice of Allowance issued in corresponding CN Patent Application No. 201611130153.3, dated Mar. 9, 2018, 2 pages.

Notification of the First Office Action (including English translation) issued in corresponding Chinese Patent Application No. 201611130153.3, dated Sep. 28, 2017, 18 pages.

Extended European Search Report issued in corresponding European Application No. 17205508.9, dated Aug. 2, 2018, 17 pages.

* cited by examiner

OBJECT STARTING METHOD AND DEVICE

CROSS-REFERENCE TO RELATED APPLICATIONS

This application is based upon and claims priority to Chinese Patent Application No. 201611130153.3, filed on Dec. 9, 2016, the entire contents of which are incorporated herein by reference.

TECHNICAL FIELD

The present disclosure generally relates to the technical field of computers, and more particularly, to an object starting method and device.

BACKGROUND

Modern personal electronic devices, such as smartphones and tablets, generally include multiple Application Programs (sometimes shortened to APPs or Applications), each having various functions for a user to execute. As such, how rapidly an APP or the functions of an APP start or activated becomes the focus of the user's attention.

Many personal electronic devices are equipped to capture and use statistics based on use of various APPs. For instance, the icon of a frequently-used APP may be displayed by an electronic device on a desktop page or a quick access location. In this way, the user may find and activate the APP rapidly. However, a user may frequently utilize a specific function in the APP. In this case, the user must first start the APP and then find the specific function using various APP menus. As appreciated, this process may become rather tedious, particularly if an APP contains multiple layers and menus.

Therefore, there is a need for improved methods for operating personal electronic devices, and other devices.

SUMMARY

According to a first aspect of the present disclosure, there is provided an object starting method, including: displaying starting entries of n objects in a predetermined desktop page, the objects being predetermined functions in one or more APPs, the starting entries being configured to trigger respective predetermined functions and the starting entries being provided by an operating system; receiving a first operating signal acting on one of the starting entries; and starting an object corresponding to said one of the starting entries through the operating system according to the first operating signal.

According to a second aspect of the present disclosure, there is provided an object starting device, including: a processor; and a memory configured to store an instruction executable by the processor. The processor may be configured to: display starting entries of n objects in a predetermined desktop page, the objects being predetermined functions in one or more APPs, the starting entries being configured to trigger respective predetermined functions and the starting entries being provided by an operating system; receive a first operating signal acting on one of the starting entries; and start an object corresponding to said one of the starting entries through the operating system according to the first operating signal.

According to a third aspect of the disclosure, there is provided a non-transitory computer-readable storage medium having stored therein instructions that, when executed by a processor, causes the processor to perform an object starting method, the method comprising: displaying starting entries of n objects in a predetermined desktop page, the objects being predetermined functions in one or more APPs, the starting entries being configured to trigger respective predetermined functions and the starting entries being provided by an operating system; receiving a first operating signal acting on one of the starting entries; and starting an object corresponding to said one of the starting entries through the operating system according to the first operating signal.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to specific embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Rather, they are merely examples consistent with aspects related to the present disclosure as recited in the appended claims.

Figure 1:
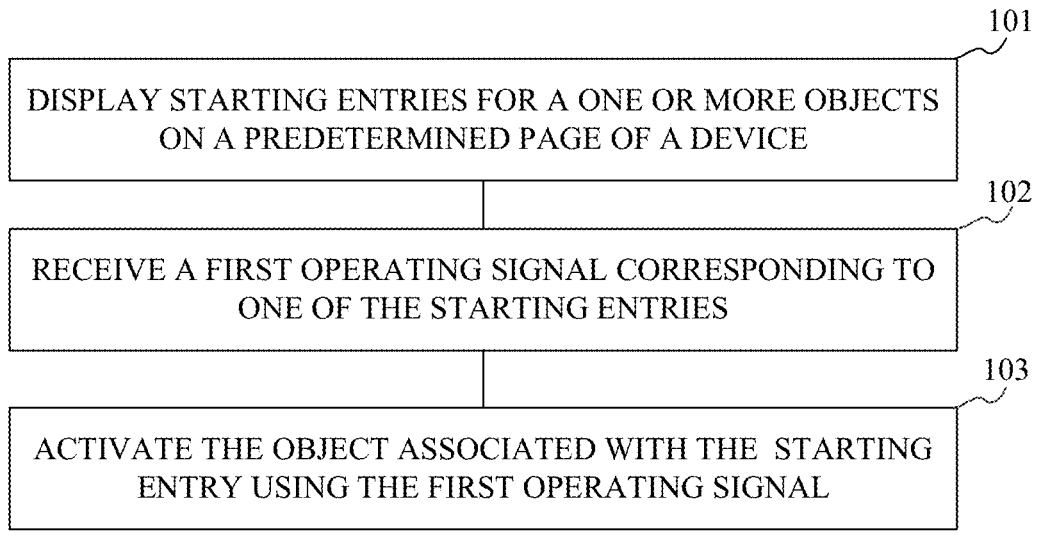
FIG. 1 is a flow chart showing an object starting method according to an aspect of the disclosure.

Referring now to FIG. 1, a flowchart setting forth steps of a process in accordance with aspects of the present disclosure is illustrated. The process, or various steps therein, may be carried out using devices in accordance with the present disclosure, or any other suitable system, device, or apparatus. In some implementations, the process may be configured as program or executable instructions stored in non-transitory computer readable media or other memory.

The process may begin at step 101 with displaying starting entries for one or more objects on a predetermined page of a device, such as a personal electronic device, where the objects may include predetermined functions associated with various APPs executable on the device. For example, the predetermined page may be a home screen, a desktop, a widget, or another device output location. The starting entries may be configured to trigger respective predetermined functions, and may be provided by the operating system of the device, as will be described. The starting entries may be displayed using various identification information, such as icons, text, symbols, and other visual indicators, or combinations thereof.

At step 102, a first operating signal corresponding to one of the starting entries is received. The first operating signal may be generated as a result of a user selection by touching or activating a screen or a button on the device. Then, using the first operating signal, the object associated with the one starting entry may be activated by way of the operating system, as indicated by step 103.

From the above, it may be appreciated that the problem of tedious searching required by a user to find a specific function in an APP is solved by way of providing direct access to such function. As such, the above-described process simplifies operation of the APP.

Figure 2:
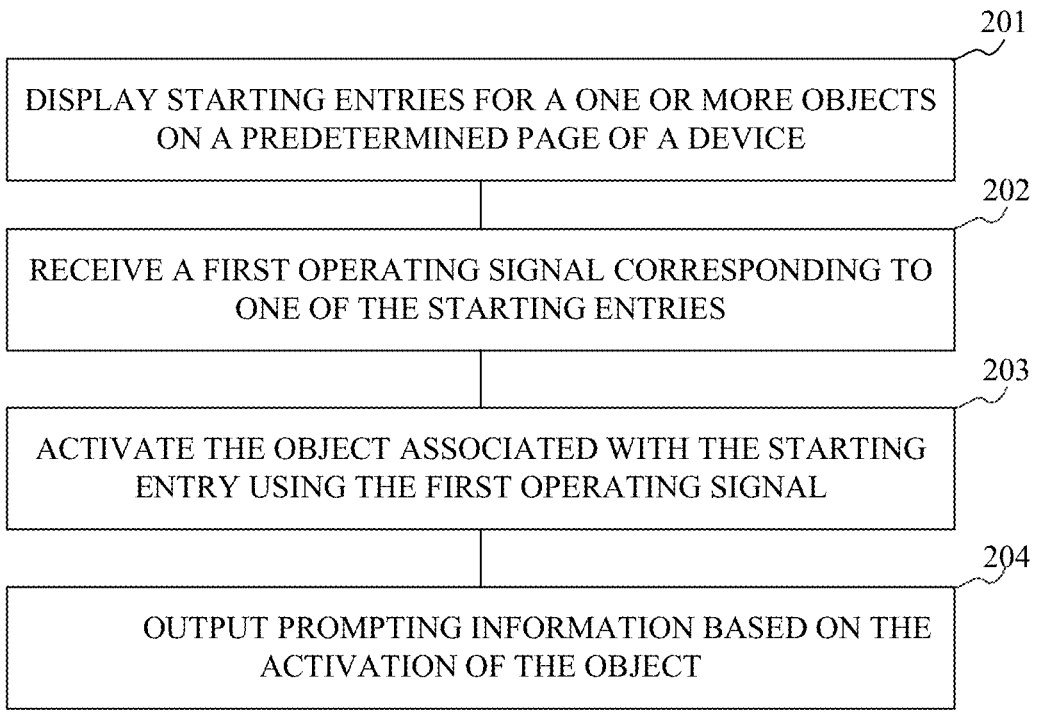
FIG. 2 is a flow chart showing an object starting method according to another aspect of the disclosure.

Referring now to FIG. 2, another flowchart setting forth steps of a process in accordance with aspects of the present disclosure is illustrated. Similarly, the process, or various steps therein, may be carried out using devices in accordance with the present disclosure, or any other suitable system, device, or apparatus. In some implementations, the process may be configured as program or executable instructions stored in non-transitory computer readable media or other memory.

The process may begin at step 201 with displaying starting entries for a number of objects a predetermined page of a device, such as a home screen, a desktop, a widget, or another device output location. As mentioned, the starting entries may be displayed using various identification information, such as icons, text, symbols, and other visual indicators, or combinations thereof. Objects associated with the displayed starting entries may include one or more predetermined functions of an APP. For example, when the APP is a payment APP, the objects may be a scanning function, a payment code function and so on; when the APP is a note APP, the object may be a note creation function and so on; when the APP is an Instant Messaging (IM) APP, the objects may be a payment code function, a party AA function, and so on; and when the APP is a microblog APP, the objects may be a my microblog function in the microblog function, and so on. These are non-limiting examples, and it may be appreciated that objects may vary depending on the functional capabilities of the respective APPs. Furthermore, the objects may also be APPs.

As described, the starting entries are configured to trigger respective predetermined functions of APPs, and such starting entries may be provided by the operating system of the device. In particular, the operating system may determine a starting manner of each object and generate the starting entry of the object according to the starting manner. For example, when an object is a page, the operating system determines that the starting manner of the object is invoking an Activity corresponding to the page. The operating system then determines an invoking entry of the Activity to be the starting entry of the object. When the object is a function in the page, the operating system determines that the starting manner of the object is invoking the Activity corresponding to the page and invoking a starting control corresponding to the function in the page. As such, the operating system determines the invoking entry of the Activity to be the starting entry of the object, and correspondingly records an operating manner of invoking the starting control in the page to invoke the starting control corresponding to the function in the page. After the operating system generates the starting entry of the object, the device may then display the starting entry, as mentioned.

If the invoking entry of the Activity is directly displayed as the starting entry, a user may not be able to identify the corresponding object from the invoking entry of the Activity. Thus, the operating system may optionally acquire identification information for the object, and associate the invoking entry of the Activity with the identification information. The associated identification information may then be displayed as the starting entry. In this manner, when a user acts on the identification information, the operating system may acquire the invoking entry associated with the identification information of the Activity, and invoke the invoking entry of the Activity. As a result an object, wherein the identification information includes at least one of an icon and name of one of then objects.

If the identification information includes an icon, such icon may be consistent with a preset icon corresponding to the APP, which allows the user to easily identify the object. In particular, the operating system may read the preset icon and set the icon to be the preset icon. If the icon of the object is not preset in the APP, the user identify the object through the name of the object. A developer may then draw an icon including the name of the object, and thereby generate the preset icon in the operating system. Similarly, the developer may draw an icon representing a predetermined function realized by the object. In addition, if the identification information includes the name of the object, the operating system may read the name of the object from the APP. This is because the name of the object is often preset in the APP. The preset name may then be used to set the name.

As described, in some implementations, the device may display the starting entries at step 201 using one or more widgets of a predetermined page. As such, the predetermined page may be a widget desktop created by the device to display widgets. The widget desktop may be distinct from an ordinary desktop commonly used by a device to display APP icons. In some implementations, the predetermined page may be HiBoard, and the widget desktop may be a desktop bookmark.

Figure 3:
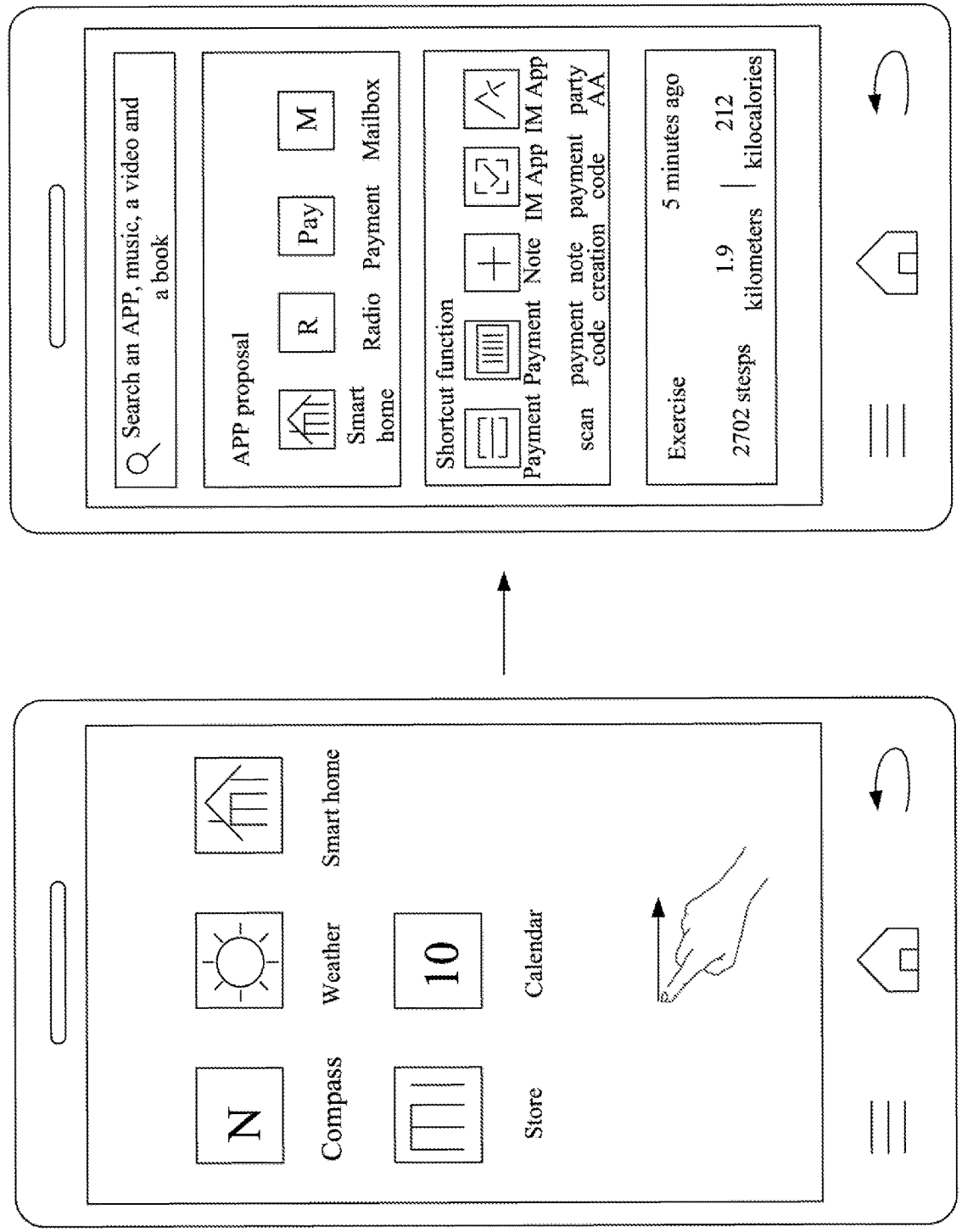
FIG. 3 is a schematic diagram illustrating a predetermined desktop page, according to another aspect of the disclosure.

Referring to the schematic of FIG. 3, non-limiting examples of predetermined pages, in accordance with aspects of the present disclosure, are shown. On the left, FIG. 3 shows an ordinary desktop of the device. When the user executes a rightward swiping operation in a blank area of the ordinary desktop, or performs another input operation, the device may then display a second predetermined page. The second predetermined page may be a widget desktop, as shown on the right of FIG. 3. As an example, the widget desktop of FIG. 3 includes "search box", "APP proposal", "shortcut function" and "exercise." In particular, the "shortcut function" displays starting entries for 5 objects. It may be appreciated that these are only examples, and the widget desktop may include similar or different objects, as well as few or more objects, arranged in any manner.

Figure 4:
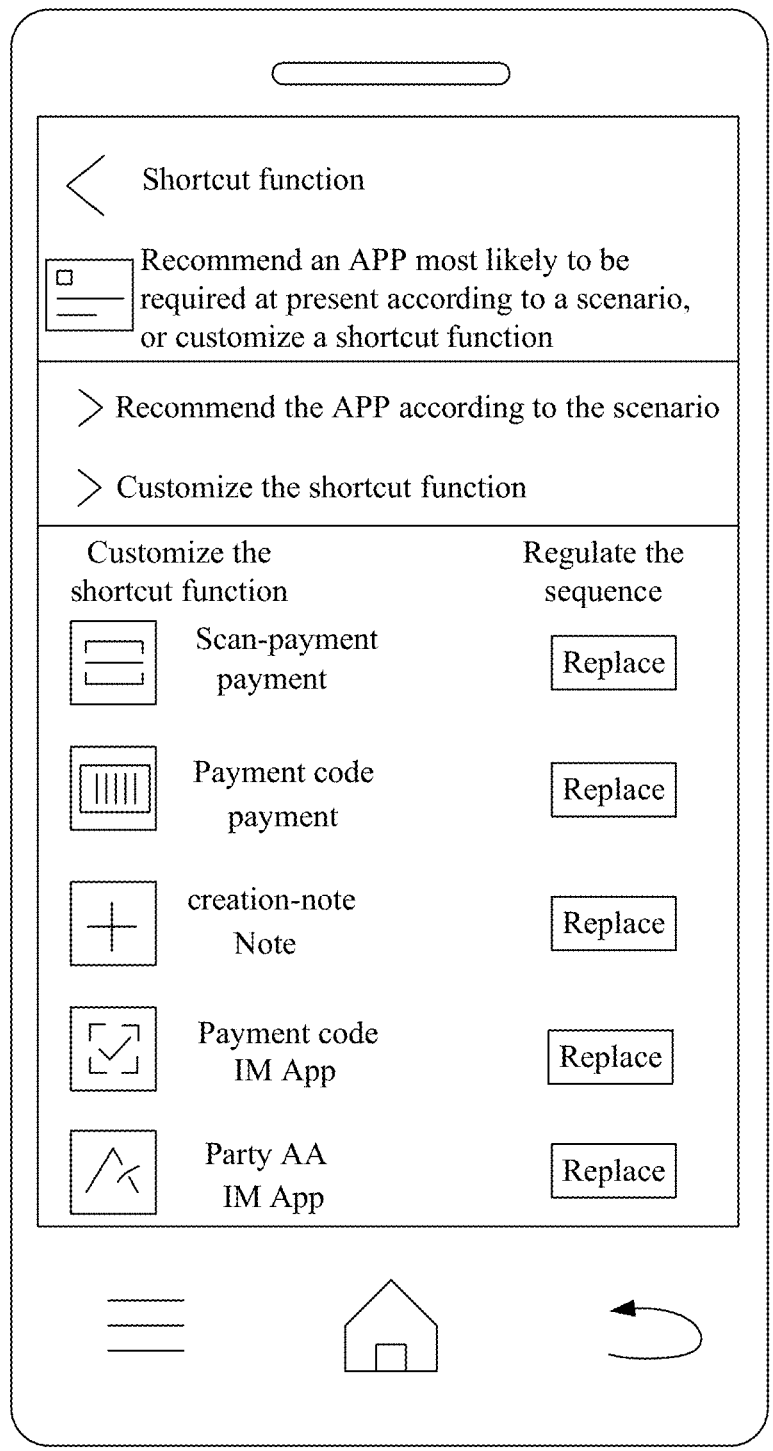
FIG. 4 is a schematic diagram illustrating selection of a desktop widget, according to another aspect of the disclosure.

In another example, FIG. 4 shows a schematic diagram illustrating selection of the desktop widget. As shown in FIGS. 3 and 4, "APP proposal" is configured to recommend an APP which may be invoked by the user according to a scenario. A "shortcut function" is configured to recommend an object which may be invoked by the user, and they have similar uses. In this manner, the device may provide an option for the user to select whether to display "APP proposal" or display "shortcut function." When the user selects an option "recommend APPs according to scenarios" corresponding to "APP proposal", the device may display "APP proposal" in the predetermined page without displaying the "shortcut function." When the user selects an option "customize shortcut functions" corresponding to "shortcut function," the device may display "shortcut function" in the predetermined page without displaying "APP proposal".

Before the starting entries of the objects are displayed, the device may also select the objects. Two object selection manners are described below, although it may be appreciated that other methods for selecting objects to be displayed may be utilized.

In a first selection manner, the device may obtain a frequency of use for each object based on multiple users. The device may then determine a priority of each object according to the frequency and select the objects according to various priorities. That is, the device may acquire a preset starting entry selection list and a preset priority list, the starting entry selection list including a starting entry of each object provided by the operating system and the priority list including priorities of starting entries of objects in the starting entry selection list. The starting entries of a number of objects, which have been installed, may then be sequentially selected from the starting entry selection list according to a descending order of priorities, for instance. The starting entries of the objects may be determined to be the starting entries of the objects displayed in the predetermined page.

The starting entry selection list includes starting entries of multiple objects, and the device may arrange the starting entries of the multiple objects according to a preset rule. For example, an arrangement sequence specified by the preset rule may be: an object of a system APP type, an object of a third-party APP type, an object of a third-party APP type which is not installed or uninstalled, and an APP. When an APP type includes multiple APPs, the APPs may be listed according to the names, for instance, in an alphabetical order. Similarly, when an APP includes multiple objects, the objects may be listed alphabetically. It may be appreciated that any order of listing or rule may be implemented. In some aspects, when an object is a predetermined function in the APP, the object may refer to the installed APP to which the object belongs.

In some aspects, priorities of the objects included in the priority list sequentially may be from high to low, namely note-note creation, IM APP-my card, IM APP-scan, payment-payment code, microblog-my microblog, calendar-calendar creation, sound recorder-start recording sounds, scan-scan to translate and calculator-scientific calculator. When the IM APP is not installed in the device, the selected objects may be note-note creation, payment-payment code, microblog-my microblog, calendar-calendar creation and sound recorder-start recording sounds. When the payment APP is not installed in the device, the selected objects may be note-note creation, IM APP-my card, IM APP-scan, microblog-my microblog and calendar-calendar creation. When the IM APP and the payment APP are not installed in the device, the selected objects may be note-note creation, microblog-my microblog, calendar-calendar creation, sound recorder-start recording sounds and scan-scan to translate.

As mentioned, priorities of the objects may be determined according to the invoking frequencies of the objects. As such, objects may be selected in a descending order, from most used to least used. Such frequency-based selection may improve the accuracy of a recommended object. In addition, the selected objects may be objects which have been installed, so that the objects may be directly invoked by the user, and the user would not required to download and install the objects. In this manner, object invoking efficiency may be improved.

In the second selection manner, the device may obtain a frequency of use from a single user and select the objects according to the invoking frequencies. That is, the device calculates objects to be recommended to the user according to a usage parameter of each object in the device. The device may also calculate objects to be recommended based on an environmental parameter of an environment where the device is located. Starting entries of the objects may then be determined to be the starting entries of the objects displayed in the predetermined page. The usage parameters may include total invoking frequencies or total invoking time lengths of the objects. In addition, usage parameters may also be invoking frequencies or invoking time lengths within a period of time.

After acquiring the usage parameter of each object, the device may sequence objects to be displayed according to a sequence. For example, the device may sequence the objects from the most used to the least used and arrange the objects to be recommended to the user accordingly. For example, when the usage parameters include monthly frequency of use, the device may record the invoking frequency of each object in the month and sequence each object according to a sequence, for example from high to low invoking sequences. The device may then arrange objects to be recommended to the user according to usage.

As described, objects may be alternatively or additionally sequenced based on environmental parameters. As an example, an environmental parameter may be a current time, a current position or a parameter of a predetermined item in a space where the device is located. In particular, the parameter of the predetermined item may be air quality, a humidity, a temperature, luminance or background lighting and the like. To this end, the device may pre-record environmental parameters when the user invokes various objects and utilize such information in displaying objects. Specifically, the device may acquire a current environmental parameter and select the objects matched with the current environmental parameter as the objects to be recommended to the user for invoking.

As appreciated from the above description, displaying objects according to the usage parameters and the environmental parameter allows for improved accuracy and increased relevancy for the recommended objects. For example, if the user buys lunch with the payment code function at twelve every day, the device may select the payment code function as an object to be recommended to the user for invoking if the current moment is twelve. In another example, if the user takes a taxi to a certain place with a taxing function at five every Thursday, the device may select the taxing function as an object to be recommended to the user for invoking when the current time is five on Thursday. In yet another example, if the user turns on a television with a television function of a smart home APP after getting back home every day, the device may select the television function as an object to be recommended to the user for invoking when the current position is home. In yet another example, when detecting that the air quality is relatively poor, for instance using a weather APP, the device may select a purifier function of a smart home function as an object to be recommended to the user for invoking. Similarly, when detecting that a room temperature is lower than a predetermined threshold, for instance using a temperature sensor, the terminal may select an air conditioning function of the smart home function as an object to be recommended to the user for invoking.

Referring again to FIG. 2, at step 202, a first operating signal corresponding to one of the starting entries is received. As mentioned, the first operating signal may be generated as a result of a user selection, for instance, by performing a starting entry clicking operation, by swiping or tapping a touch screen, by pressing a button, or performing other operation performed by the user.

Then, using the first operating signal, the object associated with the one starting entry may be activated or started by way of the operating system, as indicated by step 203. As described, the object may be a page, and may also be a function in the page. It may be appreciated that starting manners of the page and the function in the page may be different, and as such, the device may be required to select different starting manners according to different objects. Two starting manners will be described below respectively.

In the first starting manner, when the starting entry is configured to open the page of the object, the device may open the page in an intent manner through the operating system, according to the first operating signal. The operating system may invoke an invoking entry of Activity corresponding to the page in the intent manner and open the page by starting the Activity.

In the second starting manner, when the starting entry is configured to invoke a starting control of the object in a page of the APP, the device may open the page in the intent manner through the operating system according to the first operating signal. The device then simulates an operation of the user to invoke the starting control in the page. In some aspects, the operating system may invoke the invoking entry of the Activity corresponding to the page in the intent manner and may open the page by starting the Activity. The operating system may then determine the starting control of the object in the page, and simulate the operation of the user to click the starting control, thereby invoking the corresponding function through the starting control. For example, when the object is a wavelet video function in the IM APP, the operating system may invoke a page where a wavelet video control is located and then simulates clicking of the wavelet video control in the page to start the wavelet video function. In some aspects, when the operating system simulates the operation of the user to invoke the starting control at a relatively high speed, the user may not be aware that the device displays the page. That is, the user may see the object being started after operating the starting entry of the object.

In some aspects, before the operating system clicks the starting control, it may also be required to determine a position of the starting control in the page. Three determination manners are introduced below.

In the first determination manner, the operating system may identify characters in the page, and may determine the position of the starting control according to the characters. For example, when the starting control of the object is the wavelet video control, the operating system may identify the characters "wavelet video" in the page and may determine the position where the characters are located to be the position where the starting control is located.

In the second determination manner, coordinate information of the position where the starting control is located is prestored in the device. The operating system may then read the coordinate information, determine a position indicated by the coordinate information in the page and determine the position to be the position where the starting control is located.

In the third determination manner, an Identifier (ID) of the starting control is prestored in the device. The operating system may read the ID, search the page for a position corresponding to the ID and determine the position to be the position where the starting control is located.

Referring again to FIG. 2, prompting information may be outputted based on the activation of the object at step 203, as indicated by step 204. Specifically, if the object corresponding to the starting entry has failed to be activate or started through the operating system, prompting information may be provided to the user. Such prompting information may indicate a need for replacing of the starting entry of the object with a starting entry of another object. This may happen when an object is updated, and the page where the object is located has been deleted. As such, the operating system cannot open the page where the object is located, thereby causing an object starting failure.

Figure 5:
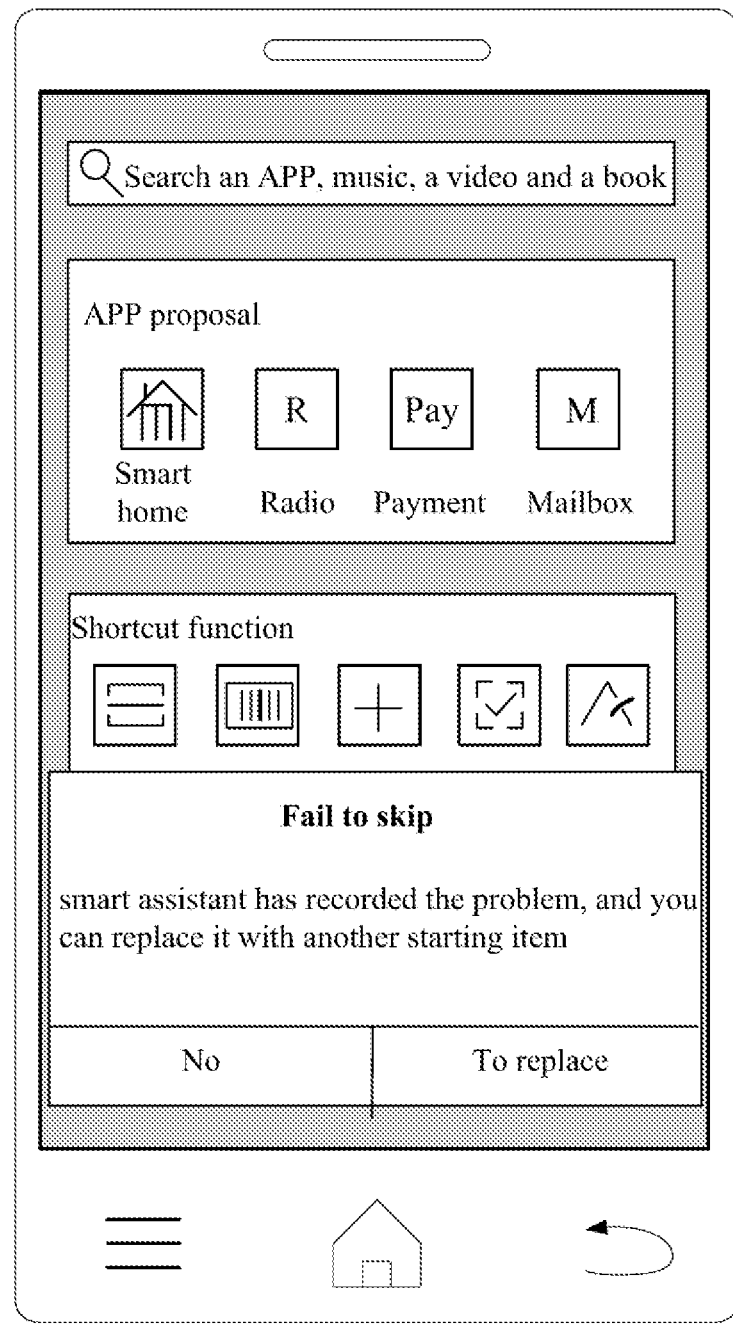
FIG. 5 is a schematic diagram illustrating prompting information, according to another aspect of the disclosure.

By way of example, FIG. 5 shows a schematic diagram illustrating the outputting of prompting information. Specifically, when the user clicks a "to replace" option, the device may display the starting entry selection list. The user may directly select a starting entry of another object to replace the starting entry of the object failed to be started from the starting entry selection list. In this manner, an operation of replacing the starting entry of the object may be simplified.

Optionally, after the starting entry of the object is displayed in the predetermined page, the user may also replace the starting entry of the object. That is, the device receives a replacement instruction configured replace the starting entry of an object displayed in the predetermined page with a starting entry of another object. Specifically, the starting entry of each object included in the starting entry selection list may be displayed. A starting entry of an object selected from the starting entry selection list is then determined, and the starting entry of the object displayed in the predetermined page is replaced with the starting entry of the selected object. By way of example, FIG. 4 shows a schematic diagram illustrating how a user may replace the starting entry of an object. As shown, each object may include "replace" option which the user may select. The device may then display the starting entry selection list where the user can select a replacement object from the starting entry selection list.

Figure 6:
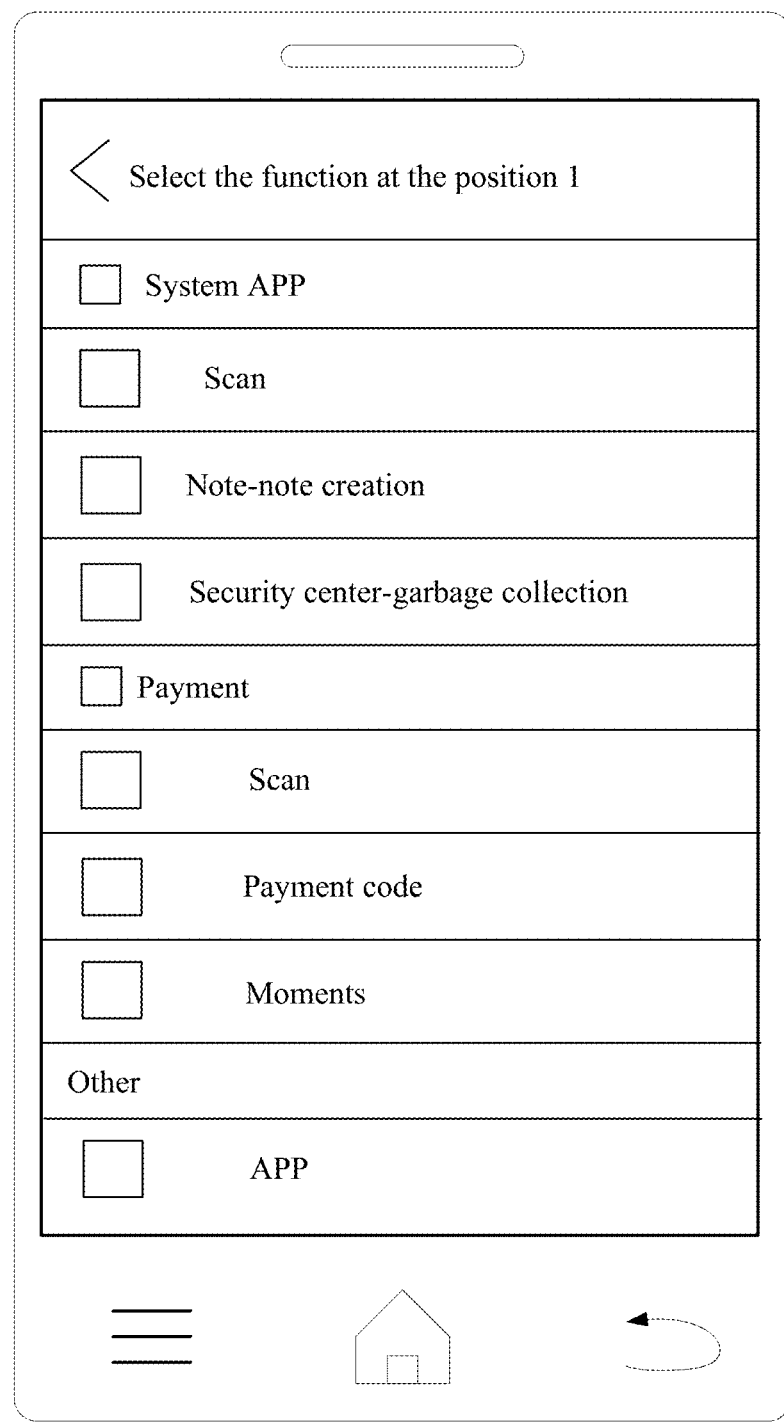
FIG. 6 is a first schematic diagram illustrating a starting entry selection list, according to another aspect of the disclosure.
Figure 7:
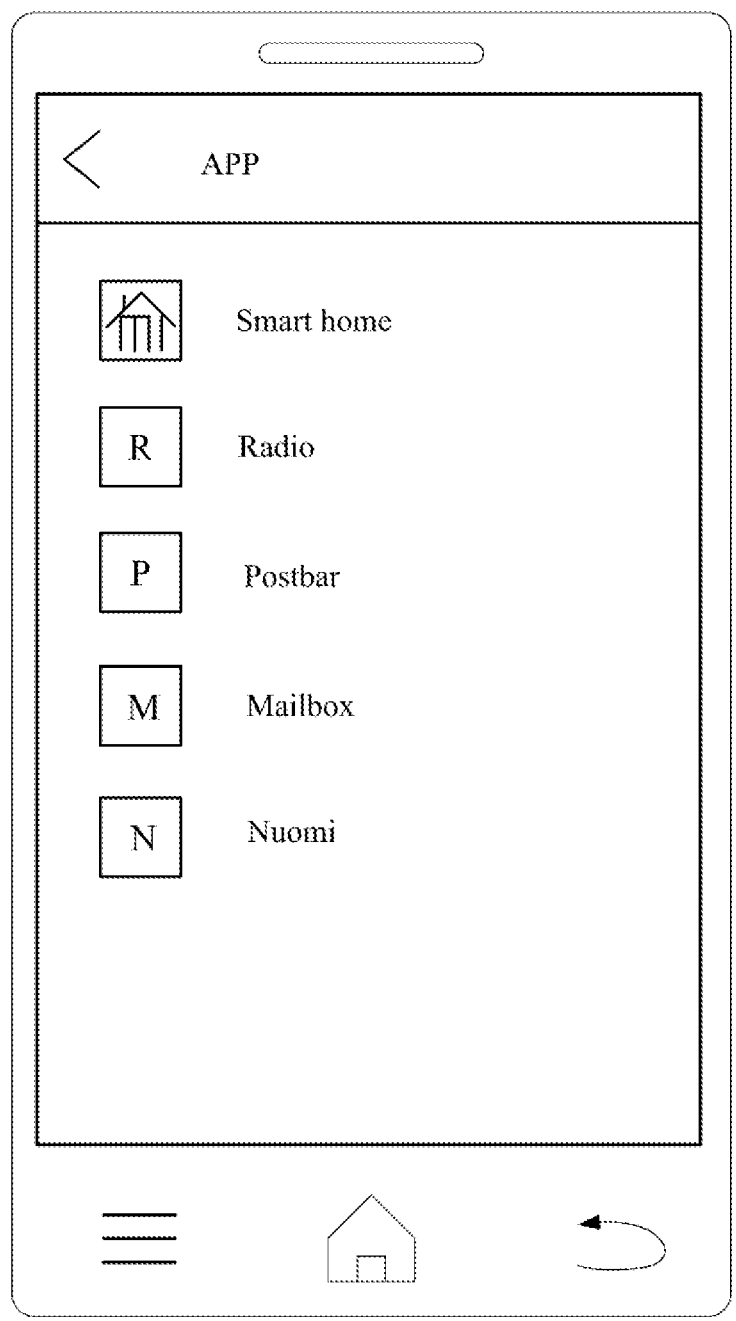
FIG. 7 is a schematic diagram illustrating selection of an APP, according to another aspect of the disclosure.

Referring now to FIG. 6, a schematic diagram illustrating an example starting entry selection list is shown. Specifically, FIG. 6 is described with the condition that the user has intended to replace the object at a position 1, for instance. In some aspects, if a user intends to select a predetermined function in an APP, the user may select an object in a system APP bar and a payment bar. If the user intends to select the APP, the user may select the APP in another bar. For instance, FIG. 7 shows a schematic diagram illustrating an example selection of the APP and multiple APPs being displayed for the user to select.

In some implementations, a starting entry selection list may include a starting entry of an object which has been installed, and further a starting entry of an object which has not been installed. The device may then display the starting entries of the two objects in different display manners allowing the user to distinguish between the two. Specifically, when the starting entry selection list includes the starting entry of the object which has not been installed and the starting entry of the object which has been installed, the device may display, according to the replacement instruction, the starting entry of the object which has not been installed in a third display manner. The device may also display, according to the replacement instruction, the starting entry of the object which has been installed in a fourth display manner, the third display manner being different from the fourth display manner. For example, the device may display the starting entries of the two objects in different fonts, font colors, background colors, transparencies, or bold and non-bold manners, respectively. Other distinguishing methods may also be utilized.

Figure 8:
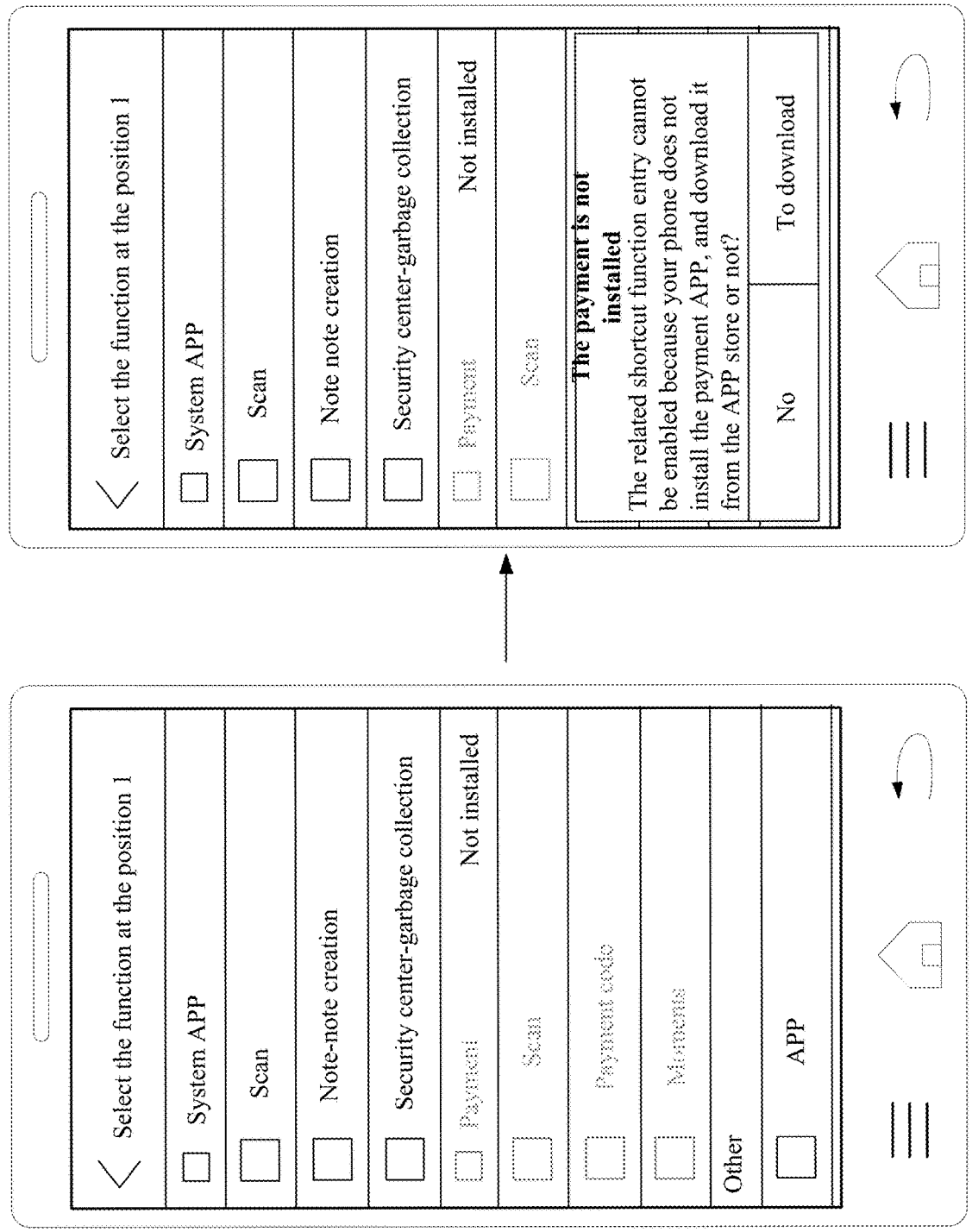
FIG. 8 is a second schematic diagram illustrating a starting entry selection list, according to another aspect of the disclosure.

Referring now to FIG. 8, a schematic diagram illustrating another example starting entry selection list is shown. Specifically, on the left side of FIG. 8, the starting entry of the object which has been installed is displayed in black font, and the starting entry of the object which has not been installed is displayed in gray font. Optionally, the device may also display text information "not installed" at a corresponding position of the object which has not been installed, as shown.

Optionally, when the selected object is not installed, a third operating control may be displayed. When a fourth operating signal acting on the third operating control is received, the object may be downloaded and installed. This is illustrated in the right side of FIG. 8. Specifically, when the user clicks a "to download" option, the device may directly skip from the starting entry selection list to a downloading page of the object. In this manner, the user may directly download an APP from the downloading page, so that an operation of downloading the object may be simplified.

Figure 9:
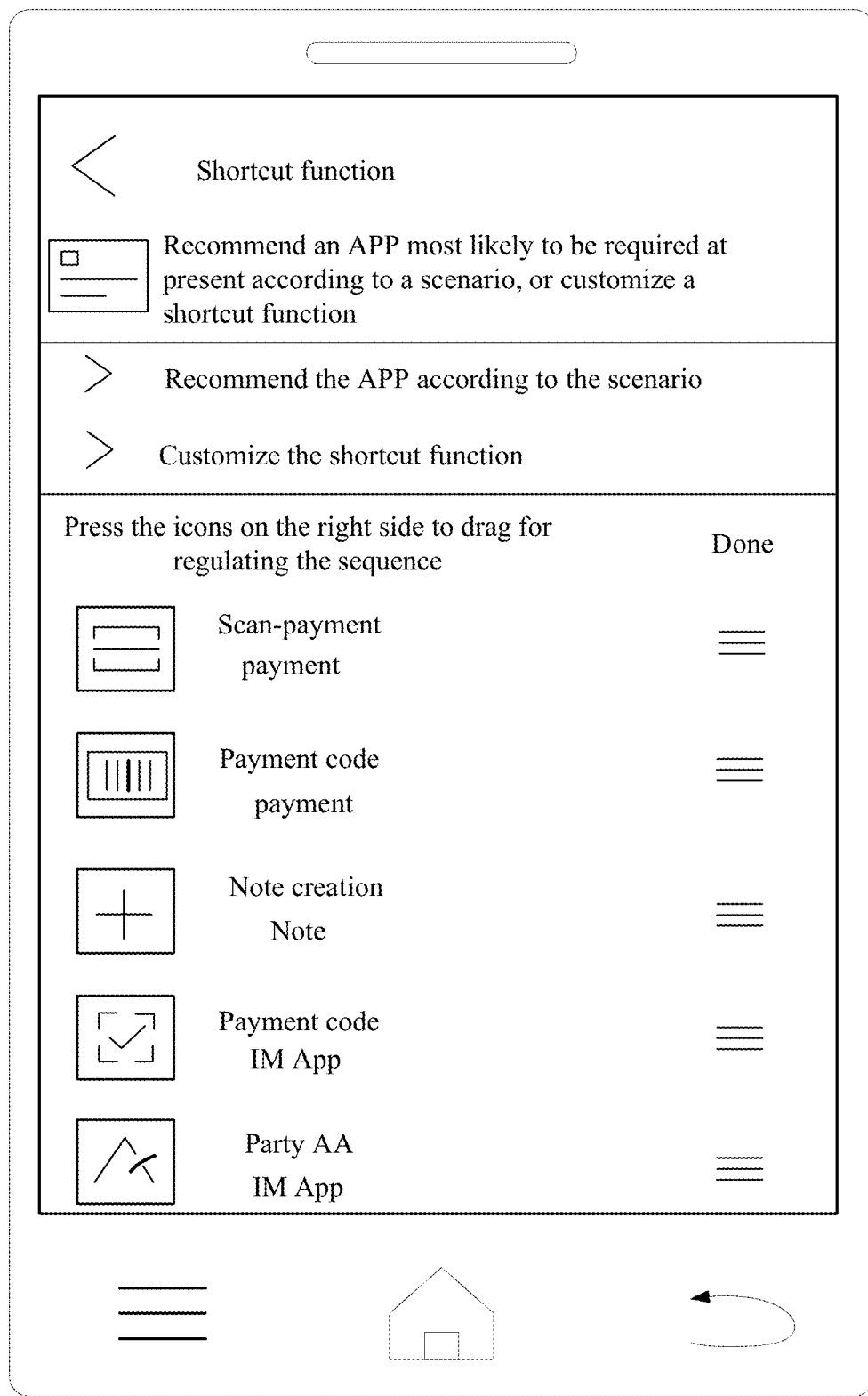
FIG. 9 is a schematic diagram illustrating regulation of starting entries, according to another aspect of the disclosure.

Optionally, the user may also regulate the sequence of the starting entries of the objects displayed in the predetermined desktop page. Referring again to FIG. 4, a "regulate the sequence" option is also displayed. When the user clicks the "regulate the sequence" option, the sequence may be regulated as illustrated in the schematic diagram illustrating of FIG. 9. Specifically, the "replace" option of each object is changed into a "≡" option, and the user may regulate the display sequence of the starting entries of the objects by dragging the "≡" options. For example, the user may press the "≡" of "payment code" and drag it to a position of "scan." As a result, the device displays "scan" at a position 1 and displays "payment code" at a position 2, where position 1 refers to the location of the first object at the top of the sequence of the starting entries.

From the above, it may be appreciated that the problem of tedious searching required by a user to find a specific function in an APP is solved by way of providing direct access to such function. As such, the above-described process simplifies operation of the APP. As described, objects to be recommended to the user may be selected according to the usage parameter of each object in the device or the environmental parameter of the environment where the device is located. Using habits of the user, the objects most likely to be invoked at a current time are recommended, thereby increasing accuracy of the recommendation.

In some aspects, a preset starting entry selection list and priority list are acquired. The starting entries of objects which have been installed may be sequentially selected from the starting entry selection list according to the descending order of the priorities. Since the priorities of the objects may be determined according to frequency of use, the objects may be selected accordingly, for instance, in a descending order. In addition, the selected objects may be objects which have been installed, allowing direct invocation by the user without need for download and install the objects separately, thereby increasing efficiency. As described, when a selected object is not installed, the third operating control may be displayed. When the fourth operating signal acting on the third operating control is received, the object may be downloaded and installed. In this a manner, the starting entry selection list may directly skip to the downloading page of the object, so that the APP is directly downloaded from the downloading page, and the operation of downloading the object is simplified. During use if a device, an object may be uninstalled. As such, methods described herein may be used to reinstall such object, as described below.

Figure 10:
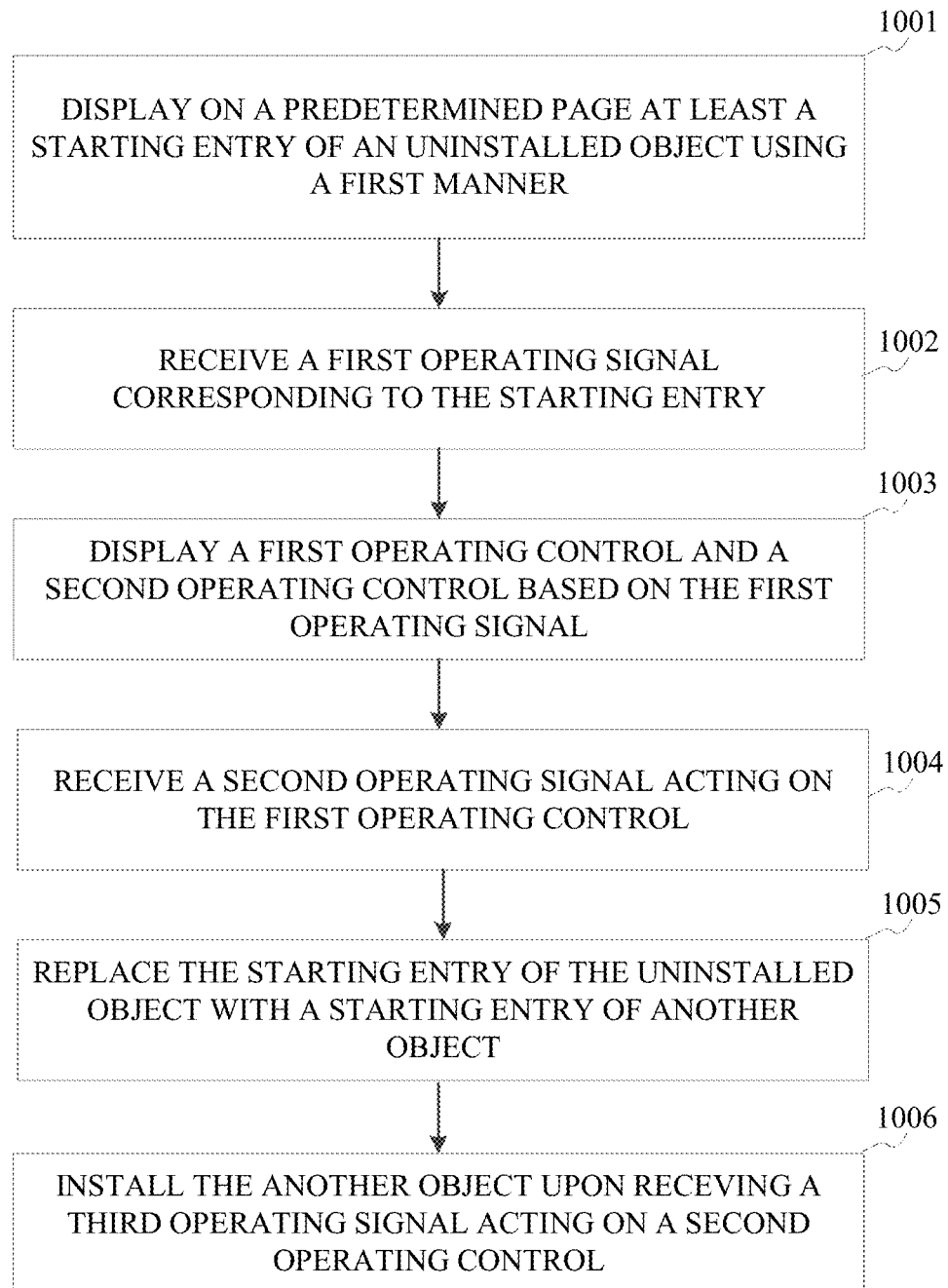
FIG. 10 is a flow chart showing an object starting method according to another aspect of the disclosure.

Referring now to FIG. 10, another flowchart setting forth steps of a process in accordance with aspects of the present disclosure is illustrated. Similarly, the process, or various steps therein, may be carried out using devices in accordance with the present disclosure, or any other suitable system, device, or apparatus. In some implementations, the process may be configured as program or executable instructions stored in non-transitory computer readable media or other memory.

The process may begin at step 1001 with displaying in a predetermined page a starting entry of the uninstalled object using a first display manner. In some aspects, a starting entry of the non-uninstalled object may also be displayed in the predetermined page using a second display manner, the first display manner being different from the second display manner. Detailed contents about the starting entries may refer to descriptions with reference to FIG. 2, and will not be elaborated herein.

When the objects include the uninstalled object and the non-uninstalled object, the device may also display the starting entries of the objects in different display manners to allow the user to distinguish between them. The device may distinguish between uninstalled and non-uninstalled objects using color, font, background, text style, transparency, and so on. When an object is a predetermined function in an APP, an uninstalled object may make reference to the APP to which the object belongs.

Figure 11:
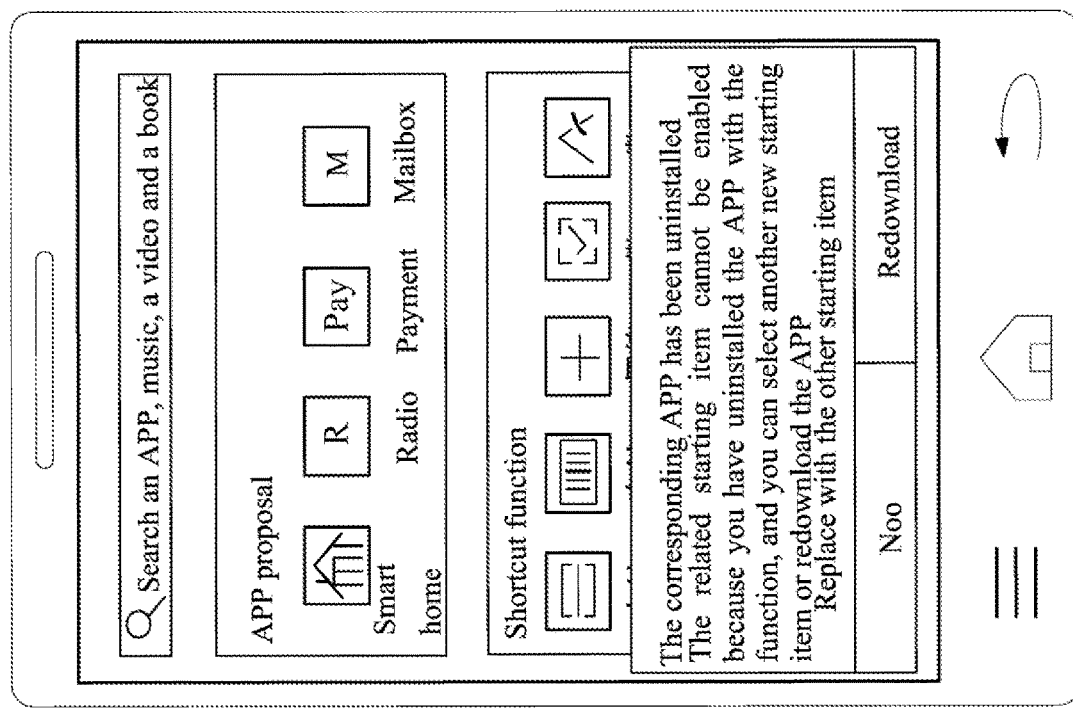
FIG. 11 is a schematic diagram illustrating starting entries of objects, according to another aspect of the disclosure.
Figure 11:
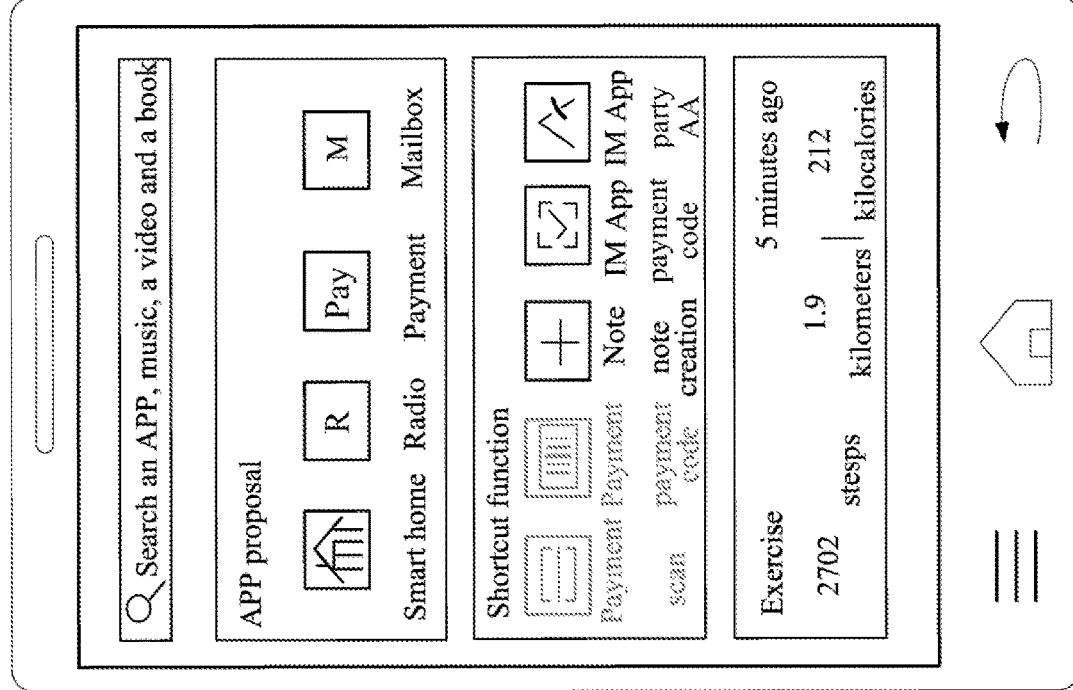

By way of example, FIG. 11 shows a schematic diagram illustrating a scenario when starting entries of the objects are uninstalled. For instance, a payment APP may have been uninstalled by the user. Thus, as shown on the left side of FIG. 11, icons and names of a scan function and payment code function corresponding to the payment APP may be displayed using a different color or shown as semitransparent. On the other hand, a note creation function in a non-uninstalled note APP and a payment code function and party AA function in a non-uninstalled IM APP may be normally displayed using solid colors.

Referring again to FIG. 10, a first operating signal corresponding to the starting entry is received. As described, the first operating signal may be generated by a starting entry clicking operation of the user, along with other operations. Then, at step 1003, a first operating control and a second operating control may be displayed according to the first operating signal. Then, at step 1004, a second operating signal acting on the first operating control is receive. The starting entry of the uninstalled object may then be replaced with a starting entry of another object, as indicated by step 1005. A third operating signal acting on a second operating control may then be received to install the object, as indicated by step 1006. This may include redownloading and reinstalling the object.

Referring again to FIG. 11, a schematic diagram illustrating this process is shown. Specifically, when the user clicks the scan function or payment code function in the payment APP, referring to the right view in FIG. 11, the first operating control displayed by the terminal may be a "replace with another starting item" option, and the second operating control is a "redownload" option, as shown. When the user clicks the "replace with another starting item" option, the device receives the second operating signal, and then displays a starting entry selection list. The user may directly select a starting entry of another object from the starting entry selection list to replace the starting entry of the uninstalled object, so that an operation of replacing the starting entry of the object may be simplified. When the user clicks the "redownload" option, the device may receive the third operating signal, directly skipping from the starting entry selection list to a downloading page of the object. There, the user may directly download an APP from the downloading page.

When an object is uninstalled, if the user does not want to continue invoking the object, the starting entry of the object may replaced with a starting entry of another object, as described. The predetermined page may directly skip to the starting entry selection list for the user to select a starting entry of another object. On the other hand, if the user wants to continue invoking the object, the object may be redownloaded and reinstalled, as described.

Figure 12:
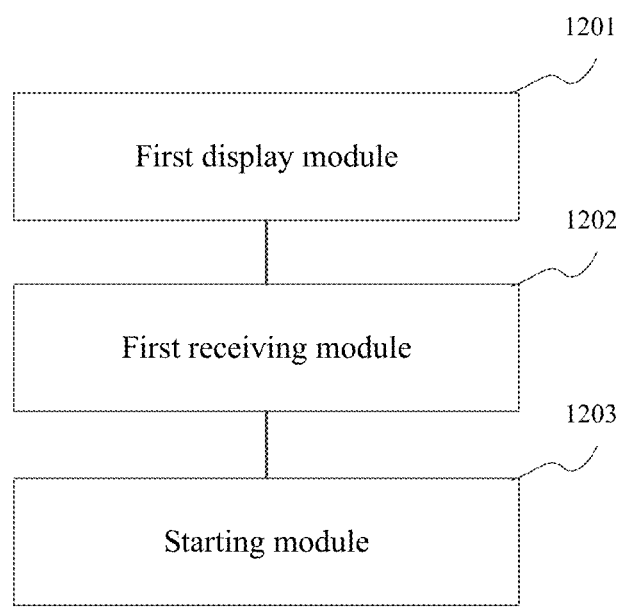
FIG. 12 is a block diagram of an object starting device according to an aspect of the disclosure.

Referring now to FIG. 12 is a block diagram of an object starting device, in accordance with aspects of the present disclosure, is shown. The object starting device may be included in a device as described with reference to FIG. 14, for example, or another suitable device and be configured to carry out methods as described herein. In general, the object starting device may include a first display module 1201, a first receiving module 1202 and a starting module 1203.

The first display module 1201 may be configured to display starting entries of one or more objects on a predetermined page. As described, objects may include predetermined functions in one or more APPs, and the starting entries may be configured to trigger respective predetermined functions. The first receiving module 1202 may be configured to receive a first operating signal acting corresponding to one of the starting entries displayed by the first display module 1201. The starting module 1203 may be configured to activate the object associated with the starting entry using the first operating signal received by the first receiving module 1202.

Figure 13:
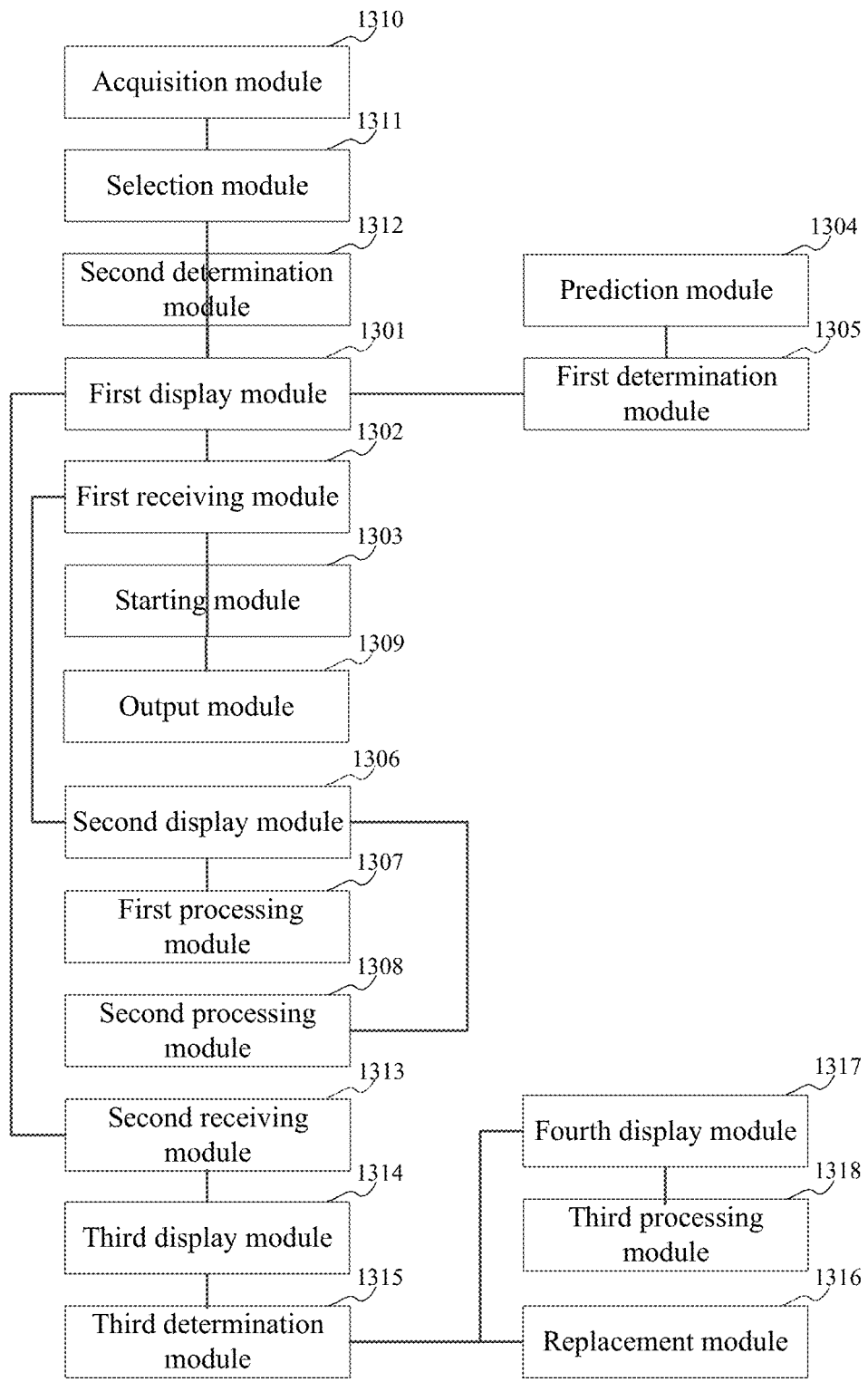
FIG. 13 is a block diagram of an object starting device according to an aspect of the disclosure.

Referring now to FIG. 13 a block diagram of an object starting device, in accordance with aspects of the present disclosure, is shown. The object starting device may be included in a device as described with reference to FIG. 14, for example, or another suitable device and be configured to carry out methods as described herein. In general, the object starting device may include a first display module 1301, a first receiving module 1302 and a starting module 1303.

The first display module 1301 may be configured to display starting entries of objects on a predetermined page, where the objects may be predetermined functions in one or more APPs. The starting entries may be configured to trigger respective predetermined functions and may be provided by an operating system. The first receiving module 1302 may be configured to receive a first operating signal acting corresponding to one of the starting entries displayed by the first display module 1301. The starting module 1303 may be configured to activate the object associated with the starting entry using the first operating signal received by the first receiving module 1302.

Optionally, the starting module 1303 is further configured to:

when the starting entry is configured to open a page of the object, open the page in an intent manner through the operating system according to the first operating signal.

Optionally, the starting module 1303 is further configured to:

when the starting entry is configured to invoke a starting control of the object in a page of the APP, open the page in the intent manner through the operating system according to the first operating signal, and simulate an operation of a user to invoke the starting control in the page.

Optionally, the device further includes: a prediction module 1304 and a first determination module 1305.

The prediction module 1304 is configured to calculate objects to be recommended to the user for invoking according to a usage parameter or an environmental parameter of an environment where the device is located.

The first determination module 1305 is configured to determine starting entries of the objects predicted by the prediction module 1304 to be the starting entries of the objects displayed on the predetermined page.

Optionally, the first display module 1301 is further configured to:

display the starting entries of the objects on a widget desktop of the predetermined page, each starting entry including at least one of an icon and name of one of the objects.

Optionally, the first display module 1301 is further configured to:

when the objects include an uninstalled object and a non-uninstalled object, display, in the predetermined page, the starting entry of the uninstalled object in a first display manner and display, in the predetermined page, the starting entry of the non-uninstalled object in a second display manner, the first display manner being different from the second display manner.

Optionally, the device further includes: a second display module 1306, a first processing module 1307 or a second processing module 1308.

The second display module 1306 is configured to, when the object corresponding to said one of the starting entries is uninstalled, display a first operating control and a second operating control according to the first operating signal.

The first processing module 1307 is configured to, when a second operating signal acting on the first operating control displayed by the second display module is received, replace the starting entry of the object with a starting entry of another object.

The second processing module 1308 is configured to, when a third operating signal acting on the second operating control displayed by the second display module is received, redownload and reinstall the object.

Optionally, the device further includes: an output module 1309.

The output module 1309 is configured to, when the object corresponding to said one of the starting entries has failed to start through the operating system, output prompting information. The prompting information may be configured to prompt the user to replace the starting entry of the object with a starting entry of another object.

Optionally, the device further includes: an acquisition module 1310, a selection module 1311 and a second determination module 1312.

The acquisition module 1310 is configured to acquire a preset starting entry selection list and a preset priority list, the starting entry selection list including a starting entry of each object provided by the operating system and the priority list including priorities of starting entries of objects in the starting entry selection list.

The selection module 1311 is configured to sequentially select the starting entries of objects which have been installed from the starting entry selection list acquired by the acquisition module 1310 according to a descending order of the priorities.

The second determination module 1312 is configured to determine the starting entries of the objects which have been installed to be the starting entries of the objects displayed in the predetermined page for the first time.

Optionally, the device further includes: a second receiving module 1313, a third display module 1314, a third determination module 1315 and a replacement module 1316.

The second receiving module 1313 is configured to receive a replacement instruction, the replacement instruction being configured to indicate replacing of a starting entry of an object displayed in the predetermined page a starting entry of another object.

The third display module 1314 is configured to display a starting entry of each object included in the starting entry selection list according to the replacement instruction received by the second receiving module 1313.

The third determination module 1315 is configured to determine a starting entry of an object selected from the starting entry selection list.

The replacement module 1316 is configured to replace the starting entry of the object displayed in the predetermined page with the starting entry of the selected object.

Optionally, the device further includes: a fourth display module 1317 and a third processing module 1318.

The fourth display module 1317 is configured to, when the selected object is not installed, display a third operating control.

The third processing module 1318 is configured to, when a fourth operating signal acting on the third operating control displayed by the fourth display module 1317 is received, download and install the selected object.

Optionally, the fourth display module 1317 is further configured to:

when the starting entry selection list includes a starting entry of an object which has not been installed and a starting entry of an object which has been installed, display, according to the replacement instruction, the starting entry of the object which has not been installed in a third display manner and display, according to the replacement instruction, the starting entry of the object which has been installed in a fourth display manner, the third display manner being different from the fourth display manner.

As appreciated from the above, starting entries of the objects may be displayed in the predetermined page using an object starting device, as provided. When the first operating signal acting on one of the starting entries is received, since the starting entry is provided by the operating system, the object corresponding to the starting entry may be directly started through the operating system to trigger respective predetermined function, indicated by the object in the APP. The user may then directly start the object through the starting entry of the object displayed on the predetermined page.

In some aspects, objects to be recommended to the user may be calculated according to the usage parameter of each object in the device or the environmental parameter of the environment where the device is located, as described. In addition, when an object corresponding to one of the starting entries is uninstalled, and if the user does not need to continue invoking the object, the starting entry of the object may be replaced with a starting entry of another object. Thus the predetermined page may directly skip to the starting entry selection list for the user to select a starting entry of another object from the starting entry selection list, so that an operation of replacing the starting entry of the object is simplified. If the user needs to continue invoking the object, the object may be redownloaded and reinstalled, and the predetermined page may directly skip to a downloading page of the object, so that an operation of downloading the object is simplified.

As described, the preset starting entry selection list and priority list may be acquired. The starting entries of the objects which have been installed may be sequentially selected from the starting entry selection list according to the descending order of the priorities, and since the priorities of the objects are determined according to invoking frequencies of the objects, the objects selected according to the descending order of the priorities may be objects most frequently invoked by the user. In addition, the selected objects may be objects which have been installed, so that the objects may be directly invoked by the user. In this manner, the user is not required to download and install the objects, and object invoking efficiency may be improved.

When the selected object is not installed, the third operating control may be displayed. When the fourth operating signal acting on the third operating control is received, the object may be downloaded and installed. The starting entry selection list may directly skip to the downloading page of the object, so that the APP is directly downloaded from the downloading page, and the operation of downloading the object is simplified.

An exemplary embodiment of the present disclosure provides an object starting device, which may implement the object starting method provided by the present disclosure. In some implementations, the object starting device may include a processor and a memory having instruction executable by the processor. In some aspects, the instructions may be stored in non-transitory computer readable medium. The processor may be configured to display starting entries of objects in a predetermined page, the objects being predetermined functions in one or more APPs, the starting entries being configured to trigger respective predetermined functions and the starting entries being provided by an operating system, as described. The processor may also be configured to receive a first operating signal acting associated with one of the starting entries, and activate an object corresponding the starting entry using the first operating signal.

Figure 14:
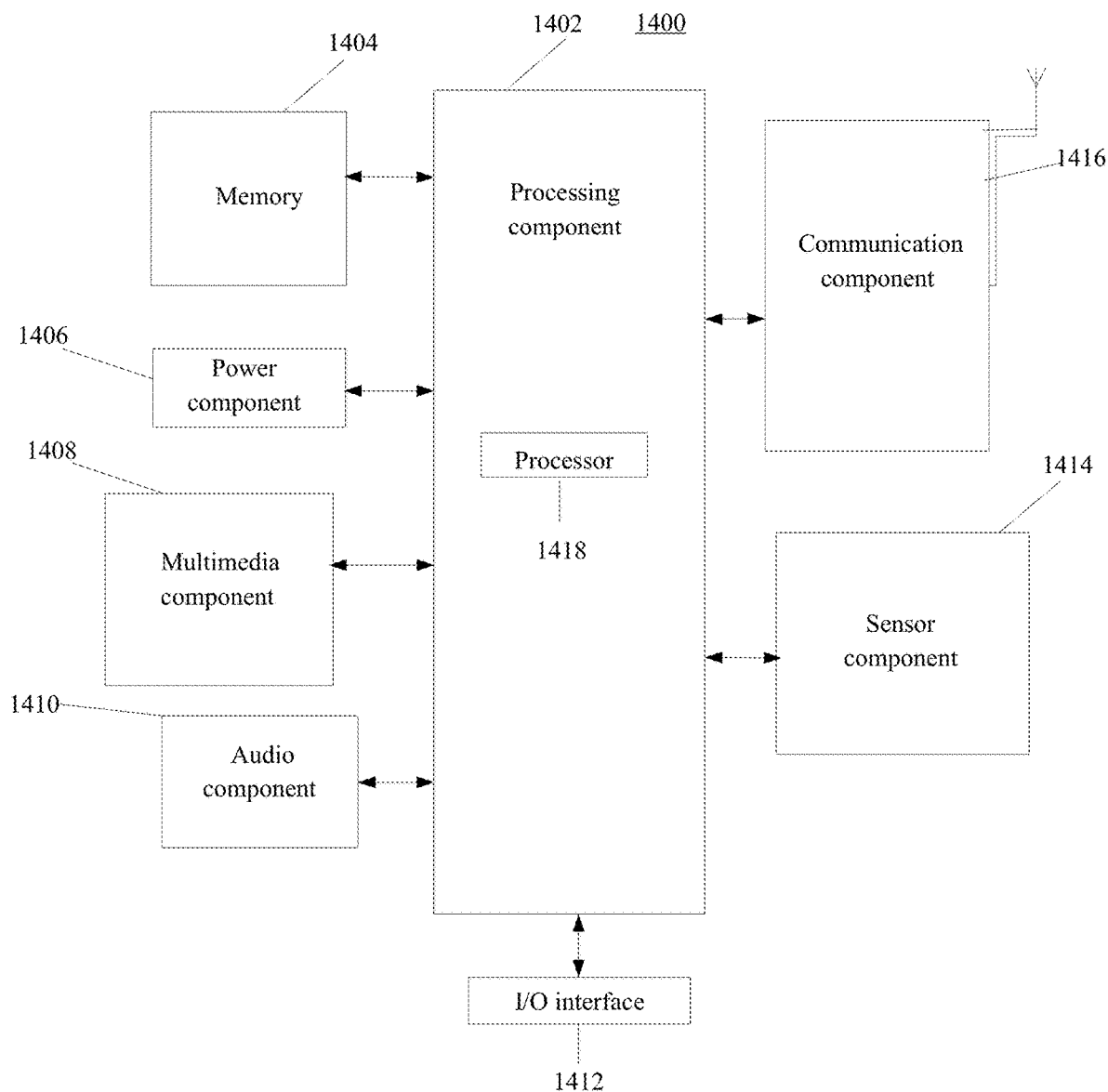
FIG. 14 is a block diagram of an object starting device according to an aspect of the disclosure.

Referring now to FIG. 14 a block diagram of an example device 1400, in accordance with aspects of the present disclosure, is shown. For example, the device 1400 may be a mobile phone, a computer, a digital broadcast terminal, a messaging device, a gaming console, a tablet, a medical device, exercise equipment, a personal digital assistant and the like. In general, the device 1400 may include one or more of the following components: a processing component 1402, a memory 1404, a power component 1406, a multimedia component 1408, an audio component 1410, an Input/Output (I/O) interface 1412, a sensor component 1414, and a communication component 1416.

The processing component 1402 typically controls overall operations of the device 1400, such as the operations associated with display, telephone calls, data communications, camera operations, and recording operations. The processing component 1402 may include one or more processors 1418 to execute instructions to perform all or part of the steps in the abovementioned method. Moreover, the processing component 1402 may include one or more modules which facilitate interaction between the processing component 1402 and the other components. For instance, the processing component 1402 may include a multimedia module to facilitate interaction between the multimedia component 1408 and the processing component 1402.

The memory 1404 is configured to store various types of data to support the operation of the device 1400. Examples of such data include instructions for any APPs or methods operated on the device 1400, contact data, phonebook data, messages, pictures, video, etc. The memory 1404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1406 provides power for various components of the device 1400. The power component 1406 may include a power management system, one or more power supplies, and other components associated with the generation, management and distribution of power for the device 1400.

The multimedia component 1408 includes a screen providing an output interface between the device 1400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 1408 includes a front camera and/or a rear camera. The front camera and/or the rear camera may receive external multimedia data when the device 1400 is in an operation mode, such as a photographing mode or a video mode. Each of the front camera and the rear camera may be a fixed optical lens system or have focusing and optical zooming capabilities.

The audio component 1410 is configured to output and/or input an audio signal. For example, the audio component 1410 includes a Microphone (MIC), and the MIC is configured to receive an external audio signal when the device 1400 is in the operation mode, such as a call mode, a recording mode and a voice recognition mode. The received audio signal may be further stored in the memory 1404 or sent through the communication component 1416. In some embodiments, the audio component 1410 further includes a speaker configured to output the audio signal.

The I/O interface 1412 provides an interface between the processing component 1402 and a peripheral interface module, and the peripheral interface module may be a keyboard, a click wheel, a button and the like. The button may include, but is not limited to: a home button, a volume button, a starting button and a locking button.

The sensor component 1414 includes one or more sensors configured to provide status assessment in various aspects for the device 1400. For instance, the sensor component 1414 may detect an on/off status of the device 1400 and relative positioning of components, such as a display and small keyboard of the device 1400, and the sensor component 1414 may further detect a change in a position of the device 1400 or a component of the device 1400, presence or absence of contact between the user and the device 1400, orientation or acceleration/deceleration of the device 1400 and a change in temperature of the device 1400. The sensor component 1414 may include a proximity sensor configured to detect presence of an object nearby without any physical contact. The sensor component 1414 may also include a light sensor, such as a Complementary Metal Oxide Semiconductor (CMOS) or Charge Coupled Device (CCD) image sensor configured for use in an imaging application. In some embodiments, the sensor component 1414 may also include an acceleration sensor, a gyroscope sensor, a magnetic sensor, a pressure sensor or a temperature sensor.

The communication component 1416 is configured to facilitate wired or wireless communication between the device 1400 and other equipment. The device 1400 may access a communication-standard-based wireless network, such as a Wireless Fidelity (WiFi) network, a 2nd-Generation (2G) or 3rd-Generation (3G) network or a combination thereof. In an exemplary embodiment, the communication component 1416 receives a broadcast signal or broadcast associated information from an external broadcast management system through a broadcast channel. In an exemplary embodiment, the communication component 1416 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a Bluetooth (BT) technology and another technology.

In an exemplary embodiment, the device 1400 may be implemented by one or more circuitry, which include Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components. The device 1400 may use the circuitry in combination with the other hardware or software components for performing the above described methods. Each module, sub-module, unit, or sub-unit in the disclosure may be implemented at least partially using the one or more circuitry.

In an exemplary embodiment, there is also provided a non-transitory computer-readable storage medium including an instruction, such as the memory 1404 including an instruction, and the instruction may be executed by the processor 1418 of the device 1400 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An object starting method, comprising:
displaying, on a predetermined page of a device, starting entries of one or more objects, the starting entries being generated by an operating system, wherein a first group of the one or more objects comprises one or more applications, and a second group of the one or more objects comprises shortcuts to one or more dynamically recommended functions of the one or more applications, the first group of the one or more objects and the second group of the one or more objects are displayed in separate regions on the predetermined page, the starting entries are generated dynamically according to a usage of the recommended functions, and the shortcuts to the one or more dynamically recommended functions of the second group are displayed concurrently with the one or more applications of the first group;
receiving a first operating signal corresponding to one of the starting entries displayed;
activating a first object from among the one or more objects, the first object corresponding to the one of the starting entries using the first operating signal, wherein activating the first object further comprises:
 when the one of the starting entries is configured to open a page of the first object, opening the page of the first object in an intended manner specified in the one of the starting entries in response to the first operating signal; or
 when the one of the starting entries is configured to invoke a starting control of the first object in a page of an application, opening the page of the application in an intended manner specified in the one of the starting entries in response to the first operating signal, and simulating a click operation by a user on the starting control to invoke the starting control in the page of the application; and
when an object comprising an application or a shortcut to a dynamically recommended function fails to activate, outputting prompting information indicating a need for replacing a starting entry of the object to the user and based on a user input replacing the starting entry of the object with a starting entry of another different object, wherein the different object comprises a shortcut to another dynamically recommended function that is different from the object failing to activate, wherein the different object is dynamically recommended based on environmental parameters that comprises air quality and humidity.

2. The method of claim 1, further comprising:
calculating objects to be recommended to a user according to a usage parameter of each object on the device or an environmental parameter of an environment where the device is located; and
determining starting entries of the objects as the starting entries of the objects displayed in the predetermined page.

3. The method of claim 1, further comprising:
acquiring a preset starting entry selection list and a preset priority list, the starting entry selection list comprising a starting entry of each object provided by an operating system and the priority list comprising priorities of starting entries of objects in the starting entry selection list;
sequentially selecting starting entries of objects which have been installed from the starting entry selection list according to a descending order of the priorities; and
determining the starting entries of the objects which have been installed to be the starting entries of the objects displayed in the predetermined page.

4. The method of claim 3, further comprising:
receiving replacement instruction configured to indicate replacing of a starting entry of an object displayed in the predetermined page with a starting entry of another object;
displaying a starting entry of each object comprised in the starting entry selection list according to the replacement instruction;
determining a starting entry of an object selected from the starting entry selection list; and
replacing the starting entry of the object displayed in the predetermined page with the starting entry of the selected object.

5. The method of claim 1, further comprising:
when the one of the starting entries is configured to invoke the starting control of the first object in the page of the application, determining a position of the starting control by at least one of:

identifying characters in the page, and determining the position of the starting control according to the characters;

reading prestored coordinate information of the position of the starting control, determining a position indicated by the coordinate information in the page, and determining the position to be the position of the starting control; or reading a prestored Identifier (ID) of the starting control, searching the page for a position corresponding to the ID, and determining the position corresponding to the ID to be the position of the starting control.

6. A device, comprising:

a processor; and a memory configured to store instructions executable by the processor to:

display starting entries of one or more objects in a predetermined page, the starting entries being generated by an operating system, wherein a first group of the one or more objects comprises one or more applications, and a second group of the one or more objects comprises shortcuts to one or more dynamically recommended functions of the one or more applications, the first group of the one or more objects and the second group of the one or more objects are displayed in separate regions on the predetermined page, the starting entries are generated dynamically according to a usage of the recommended functions, and the shortcuts to the one or more dynamically recommended functions of the second group are displayed concurrently with the one or more applications of the first group;

receive a first operating signal corresponding to one of the starting entries; and activate a first object associated with the one of the starting entries using the first operating signal; wherein when activate the first object, the processor is further configured to:

when the one of the starting entries is configured to open a page of the first object, open the page of the first object in an intended manner specified in the one of the starting entries in response to the first operating signal; or when the one of the starting entries is configured to invoke a starting control of the first object in a page of an application, open the page of the application in an intended manner specified in the one of the starting entries in response to the first operating signal, and simulate a click operation by a user on the starting control to invoke the starting control in the page of the application; and when an object comprising an application or a shortcut to a dynamically recommended function fails to activate, outputting prompting information indicating a need for replacing a starting entry of the object to the user and based on a user input replacing the starting entry of the object with a starting entry of another different object, wherein the different object comprises another application or a shortcut to another dynamically recommended function that is different from the object failing to activate, wherein the different object is dynamically recommended based on environmental parameters that comprises air quality and humidity.

7. The device of claim 6, wherein the processor is further configured to:

calculate objects to be recommended to a user according to a usage parameter of each object on the device or an environmental parameter of an environment where the device is located; and determine starting entries of the objects as the starting entries of the objects displayed in the predetermined page.

8. The device of claim 6, wherein the processor is further configured to:

display the starting entries of the objects in a widget desktop of the predetermined page, each starting entry comprising at least one of an icon and name of one of the objects.

9. The device of claim 6, wherein the processor is further configured to:

when the objects comprise an uninstalled object and an installed object, display in the predetermined page the starting entry of the uninstalled object in a first display manner and the starting entry of the installed object in a second display manner.

10. The device of claim 9, wherein the processor is further configured to:

when the object corresponding to the one of the starting entries is uninstalled, display a first operating control and a second operating control according to the first operating signal;

when a second operating signal acting on the first operating control is received, replace the starting entry of the object with a starting entry of another object; and when a third operating signal acting on the second operating control is received, redownload and reinstall the object.

11. The device of claim 6, wherein the processor is further configured to:

acquire a preset starting entry selection list and a preset priority list, the starting entry selection list comprising a starting entry of each object provided by an operating system and the priority list comprising priorities of starting entries of objects in the starting entry selection list;

sequentially select starting entries of objects which have been installed from the starting entry selection list according to a descending order of the priorities; and determine the starting entries of the objects which have been installed to be the starting entries of the objects displayed on the predetermined page for the first time.

12. The device of claim 6, wherein the processor is further configured to:

receive replacement instruction configured to indicate replacing of a starting entry of an object displayed in the predetermined page with a starting entry of another object;

display a starting entry of each object comprised in the starting entry selection list according to the replacement instruction;

determine a starting entry of an object selected from the starting entry selection list; and replace the starting entry of the object displayed in the predetermined page with the starting entry of the selected object.

13. The device of claim 12, wherein the processor is further configured to:

when the selected object is not installed, display a third operating control; and when a fourth operating signal acting on the third operating control is received, download and install the selected object.

14. The device of claim 12, wherein the processor is further configured to:
when the starting entry selection list comprises a starting entry of an object which has not been installed and a starting entry of an object which has been installed, display, according to the replacement instruction, the starting entry of the object which has not been installed in a third display manner and display, according to the replacement instruction, the starting entry of the object which has been installed in a fourth display manner.

15. The device of claim 6, wherein the processor is further configured to:
when the one of the starting entries is configured to invoke the starting control of the first object in the page of the application, determine a position of the starting control by at least one of:
identifying characters in the page, and determine the position of the starting control according to the characters;
reading prestored coordinate information of the position of the starting control, determining a position indicated by the coordinate information in the page, and determining the position to be the position of the starting control; or
reading a prestored Identifier (ID) of the starting control, searching the page for a position corresponding to the ID, and determining the position corresponding to the ID to be the position of the starting control.

16. A non-transitory computer-readable storage medium having stored therein instructions that, when executed by a processor, causes the processor to perform an object starting method, the method comprising:
displaying starting entries of one or more objects in a predetermined page of a device, the starting entries being generated by an operating system, wherein a first group of the one or more objects comprises one or more applications, and a second group of the one or more objects comprises shortcuts to one or more dynamically recommended functions of the one or more applications, the first group of the one or more objects and the second group of the one or more objects are displayed in separate regions on the predetermined page, the starting entries are generated dynamically according to a usage of the recommended functions, and the shortcuts to the one or more dynamically recommended functions of the second group are displayed concurrently with the one or more applications of the first group;

receiving a first operating signal corresponding to one of the starting entries; and
activating a first object associated with the one of the starting entries using the first operating signal wherein activating the first object further comprises:
when the one of the starting entries is configured to open a page of the first object, opening the page of the first object in an intended manner specified in the one of the starting entries in response to the first operating signal; or
when the one of the starting entries is configured to invoke a starting control of the first object in a page of an application, opening the page of the application in an intended manner specified in the one of the starting entries in response to the first operating signal, and simulating a click operation by a user on the starting control to invoke the starting control in the page of the application; and
when an object comprising an application or a shortcut to a dynamically recommended function fails to activate, outputting prompting information indicating a need for replacing a starting entry of the object to the user and based on a user input replacing the starting entry of the object with a starting entry of another different object, wherein the different object comprises another application or a shortcut to another dynamically recommended function that is different from the object failing to activate, wherein the different object is dynamically recommended based on environmental parameters that comprises air quality and humidity.

17. The non-transitory computer-readable storage medium of claim 16, wherein the method further comprises:
when the one of the starting entries is configured to invoke the starting control of the first object in the page of the application, determining a position of the starting control by at least one of:
identifying characters in the page, and determining the position of the starting control according to the characters;
reading prestored coordinate information of the position of the starting control, determining a position indicated by the coordinate information in the page and determining the position to be the position of the starting control; or
reading a prestored Identifier (ID) of the starting control, searching the page for a position corresponding to the ID, and determining the position corresponding to the ID to be the position of the starting control.

* * * * *